US008812676B2

(12) United States Patent
Patil et al.

(10) Patent No.: US 8,812,676 B2
(45) Date of Patent: Aug. 19, 2014

(54) METHODS AND APPARATUS TO SELECT AND TO RESELECT A RESOURCE FOR PEER DISCOVERY IN PEER-TO-PEER NETWORKS

(75) Inventors: Shailesh Patil, Bridgewater, NJ (US); Thomas Richardson, South Orange, NJ (US); Xinzhou Wu, Monmouth Junction, NJ (US); Junyi Li, Chester, NJ (US); Saurabh Tavildar, Jersey City, NJ (US); Pablo A. Anigstein, Gillette, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 542 days.

(21) Appl. No.: 12/875,311

(22) Filed: Sep. 3, 2010

(65) Prior Publication Data

US 2012/0059935 A1    Mar. 8, 2012

(51) Int. Cl.
*G06F 15/173*     (2006.01)
*H04W 72/02*     (2009.01)
*H04W 72/04*     (2009.01)
*H04W 84/18*     (2009.01)

(52) U.S. Cl.
CPC .......... *H04W 72/02* (2013.01); *H04W 72/0493* (2013.01); *Y02B 60/50* (2013.01); *H04W 84/18* (2013.01)
USPC .......................................... 709/226; 709/224

(58) Field of Classification Search
USPC ................................. 709/226, 224
See application file for complete search history.

(56) References Cited

U.S. PATENT DOCUMENTS

| 7,397,776 | B2 | 7/2008 | Maufer et al. |
| 7,539,507 | B2 | 5/2009 | Grob et al. |
| 2003/0074244 | A1 | 4/2003 | Braxton |
| 2004/0137859 | A1* | 7/2004 | Muto ............................. 455/126 |
| 2008/0126490 | A1 | 5/2008 | Ahlenius et al. |
| 2008/0155102 | A1 | 6/2008 | Aftelak et al. |
| 2008/0155117 | A1 | 6/2008 | Hu et al. |
| 2008/0188230 | A1* | 8/2008 | Jeon et al. ..................... 455/450 |
| 2009/0016261 | A1 | 1/2009 | Laroia et al. |

(Continued)

FOREIGN PATENT DOCUMENTS

| WO | WO2008090524 A2 | 7/2008 |
| WO | WO2009130361 A1 | 10/2009 |
| WO | WO2010056181 A1 | 5/2010 |

OTHER PUBLICATIONS

Wang, Bin and Zhao, Dongmei, "Downlink Power Distribution in a Wireless CDMA Network with Cooperative Relaying", Department of Electrical and Computer Engineering, McMaster University, Hamilton, Ontario, IEEE ICC 2009, (6 pages).

(Continued)

*Primary Examiner* — Waseem Ashraf
(74) *Attorney, Agent, or Firm* — James K. O'Hare (57) ABSTRACT

A method, an apparatus, and a computer program product are provided in which signals are received on each of a plurality of resources and an energy of each of the signals of a set of the plurality of resources is determined. In addition, a resource is determined based on a probability for each of the resources in a subset of the set. The probability for selecting a resource with a lower determined energy is less than one and greater than the probability for selecting a resource with a higher determined energy. Furthermore, a signal is transmitted on the selected resource.

38 Claims, 10 Drawing Sheets

(56) References Cited

U.S. PATENT DOCUMENTS

| | | | |
|---|---|---|---|
| 2009/0016284 A1* | 1/2009 | Laroia et al. | 370/329 |
| 2009/0016363 A1 | 1/2009 | Laroia et al. | |
| 2009/0017801 A1* | 1/2009 | Laroia et al. | 455/414.1 |
| 2009/0019168 A1* | 1/2009 | Wu et al. | 709/228 |
| 2009/0019169 A1* | 1/2009 | Li et al. | 709/228 |
| 2010/0202400 A1* | 8/2010 | Richardson et al. | 370/330 |
| 2011/0021235 A1* | 1/2011 | Laroia et al. | 455/522 |
| 2011/0090799 A1* | 4/2011 | El-Hassan et al. | 370/241 |
| 2011/0268217 A1* | 11/2011 | Gormley et al. | 375/295 |
| 2012/0009964 A1* | 1/2012 | Gormley et al. | 455/509 |
| 2012/0281670 A1* | 11/2012 | Tiirola et al. | 370/330 |
| 2012/0287880 A1* | 11/2012 | Frederiksen et al. | 370/329 |

OTHER PUBLICATIONS

International Search Report and Written Opinion—PCT/US2011/05040913 ISA/EPO—Dec. 13, 2011.

Xinzhou Wu et al: "FlashLinQ: A synchronous distributed scheduler for peer-to-peer ad hoc networks", Communication, Control, and Computing (Allerton), 2010 48th Annual Allert0n Conference on, IEEE, Sep. 29, 2010, pp. 514-521, XP031899421, DOI: 10.1109/Allerton.2010.5706950 ISBN: 978-1-4244-8215-3.

* cited by examiner

METHODS AND APPARATUS TO SELECT AND TO RESELECT A RESOURCE FOR PEER DISCOVERY IN PEER-TO-PEER NETWORKS

BACKGROUND

1. Field

The present disclosure relates generally to communication systems, and more particularly, to the selecting and the reselecting of a resource for peer discovery in peer-to-peer networks.

2. Background

In an ad hoc peer-to-peer wireless network such as Flash-LinQ, peers or nodes need to discover each other's presence. Peer discovery is accomplished by each peer transmitting a peer discovery signal on a resource. A peer's presence is detected by other peers by listening for the peer's peer discovery signal. The resource used for peer discovery is typically a time frequency block. The resources are typically orthogonal, which allow receiving peers to distinguish one from another.

In an ad hoc peer-to-peer network there may be no centralized authority to assign the peer discovery resources to peers or having a centralized authority assigning the peer discovery resources may not be desirable. As such, a peer must select the peer discovery resource on which it transmits. Once a peer selects a resource on which to transmit its peer discovery signal, the peer may later reselect the resource on which to transmit its peer discovery signal based on whether other peers are using its resource. The selection and reselection of a peer discovery resource can lead to instabilities in the network, as multiple peers may select or reselect to the same resource at the same time and therefore cause additional peer discovery resource reselections. As such, there is a need for a method and apparatus for selecting and reselecting a resource for peer discovery that results in greater stability in a peer-to-peer network.

SUMMARY

In an aspect of the disclosure, a method, an apparatus, and a computer program product are provided in which signals are received on each of a plurality of resources and an energy of each of the signals of a set of the plurality of resources is determined. In addition, a resource is determined based on a probability for each of the resources in a subset of the set. The probability for selecting a resource with a lower determined energy is less than one and greater than the probability for selecting a resource with a higher determined energy. Furthermore, a signal is transmitted on the selected resource.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Figure 1:
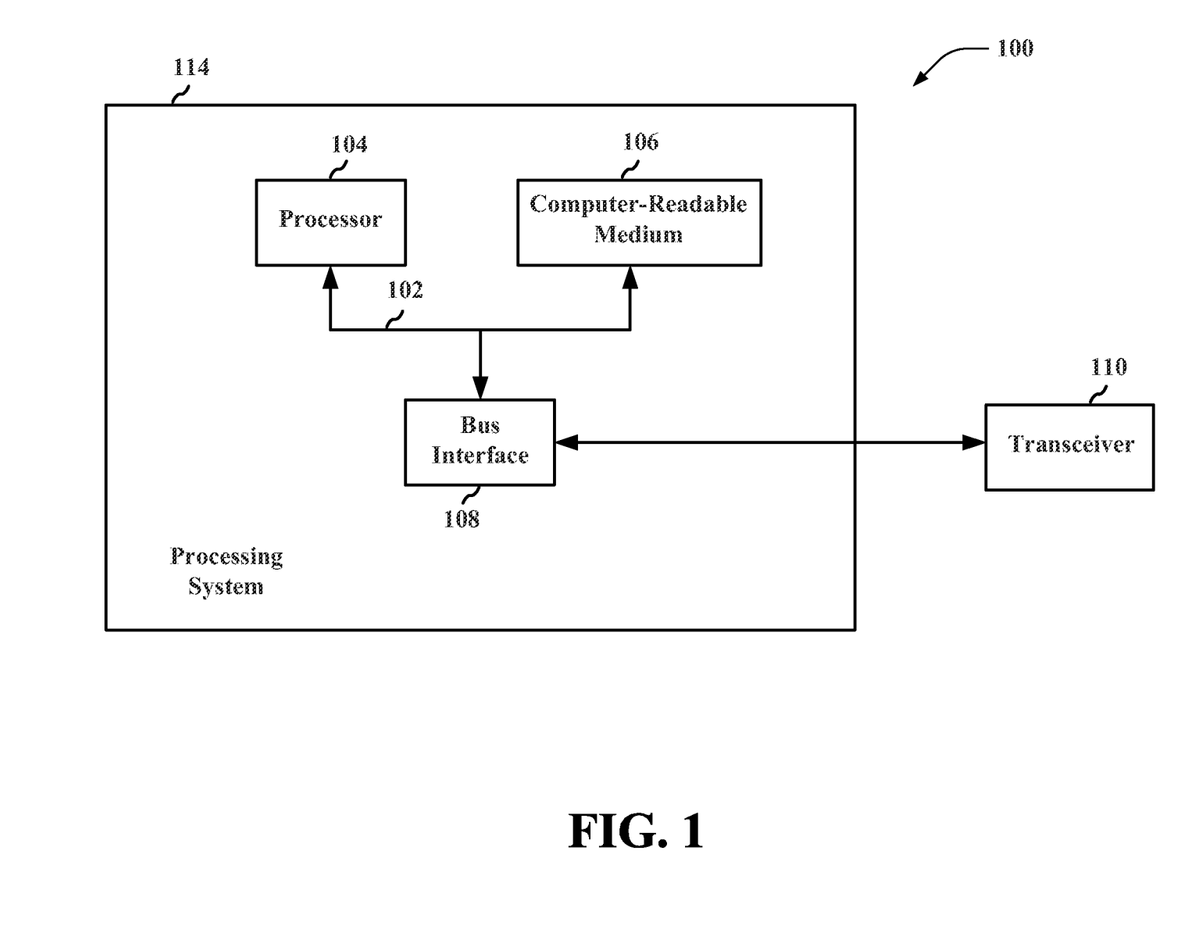
FIG. 1 is a diagram illustrating an example of a hardware implementation for an apparatus employing a processing system.

FIG. 1 is a conceptual diagram illustrating an example of a hardware implementation for an apparatus 100 employing a processing system 114. The apparatus 100 may be referred to by those skilled in the art as user equipment, a mobile station, a subscriber station, a mobile unit, a subscriber unit, a wireless unit, a wireless node, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
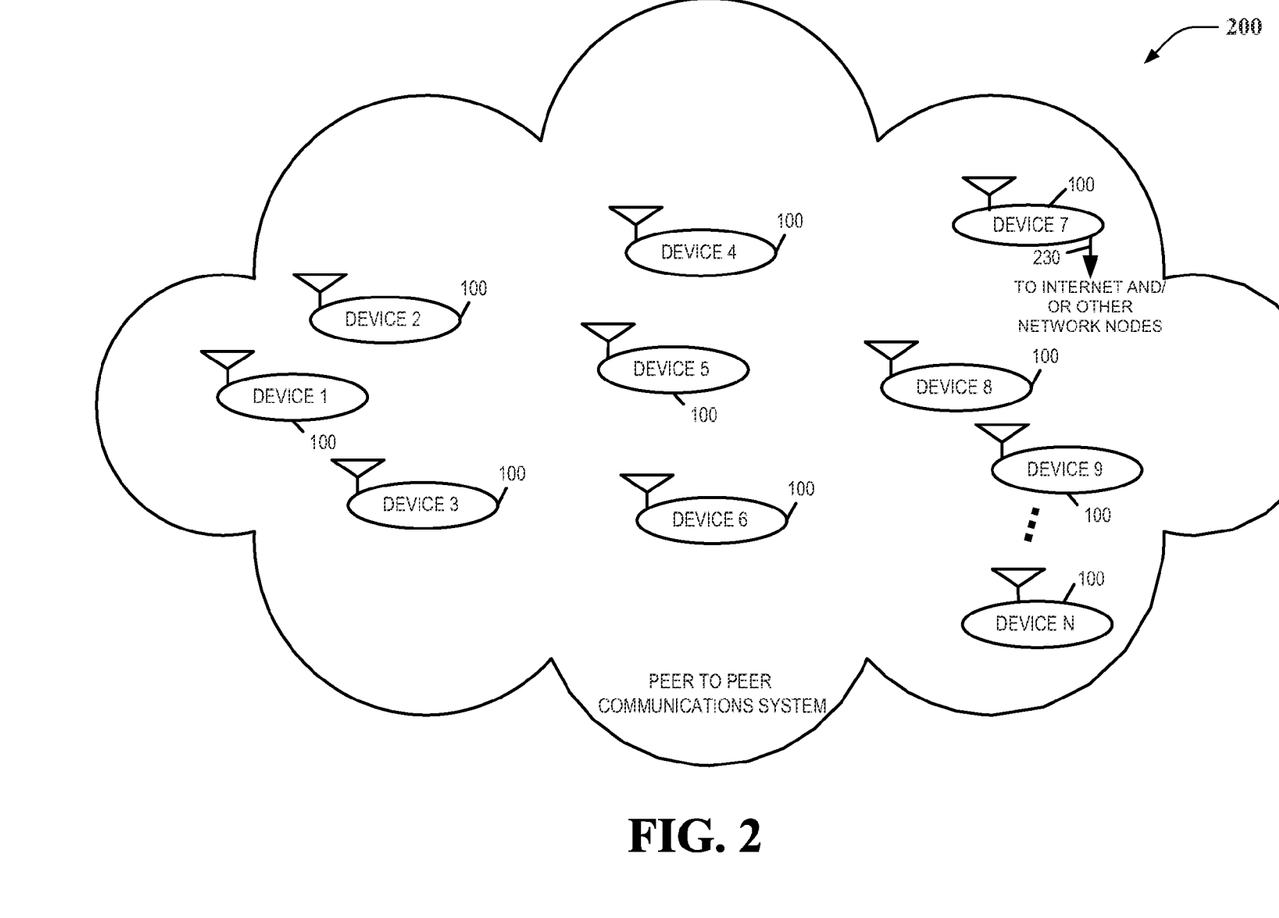
FIG. 2 is a drawing of an exemplary wireless peer-to-peer communications system.

FIG. 2 is a drawing of an exemplary wireless peer-to-peer communications system 200. The wireless peer-to-peer communications system 200 includes a plurality of wireless communications devices 100. Some of the wireless communications devices 100, such as device 7, for example, include an interface 230, to the Internet and/or other network nodes. Some of the wireless communications devices 100 may be mobile wireless communication devices such as handheld mobile devices. The wireless communications devices 100 support direct peer-to-peer communications.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ in relation to FIGS. 3, 4, 5, 6A, and 6B. However, one of ordinary skill in the art would understand that the exemplary methods and apparatuses are applicable more generally to a variety of other wireless peer-to-peer communication systems.

Figure 3:
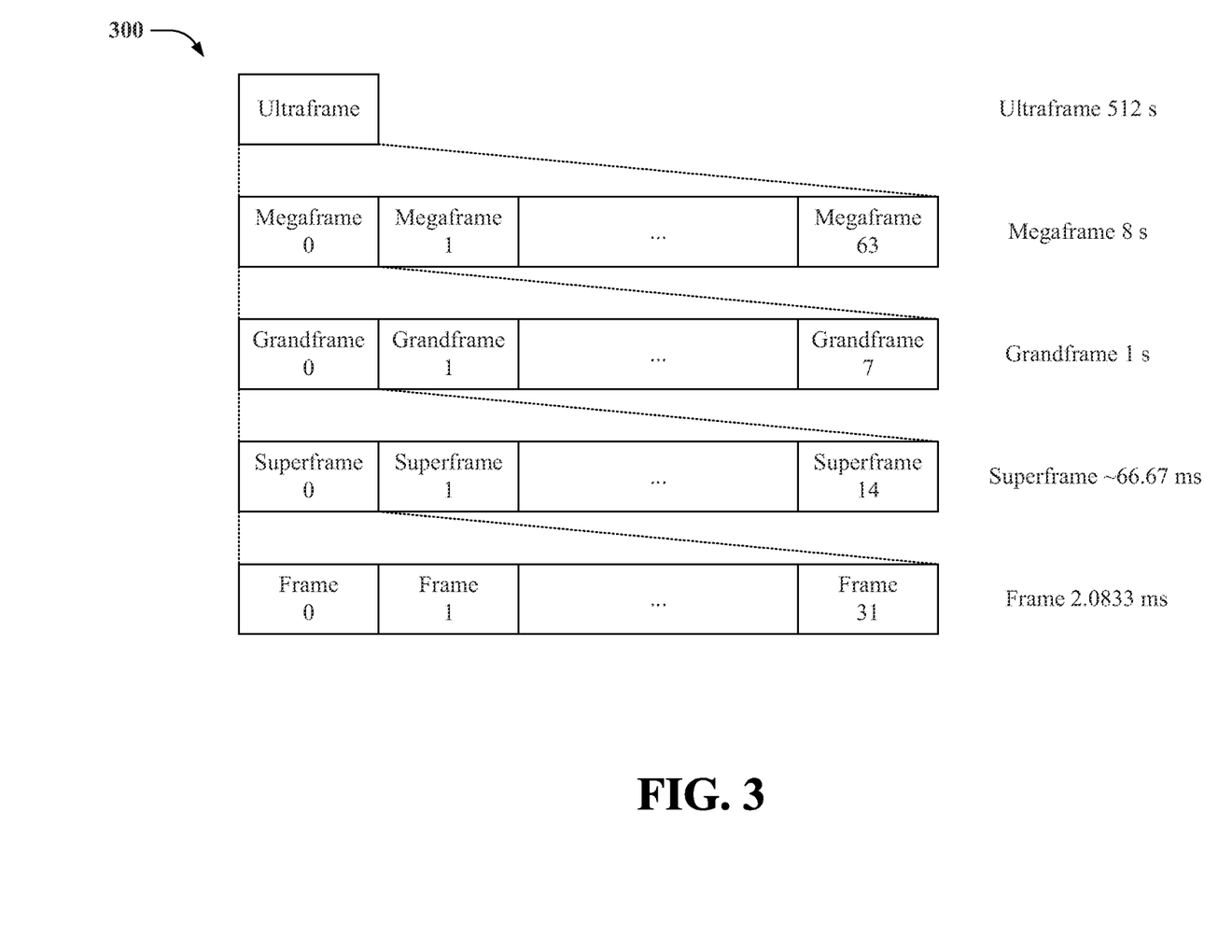
FIG. 3 is a diagram illustrating a time structure for peer-to-peer communication between the wireless communication devices.

FIG. 3 is a diagram 300 illustrating a time structure for peer-to-peer communication between the wireless communication devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
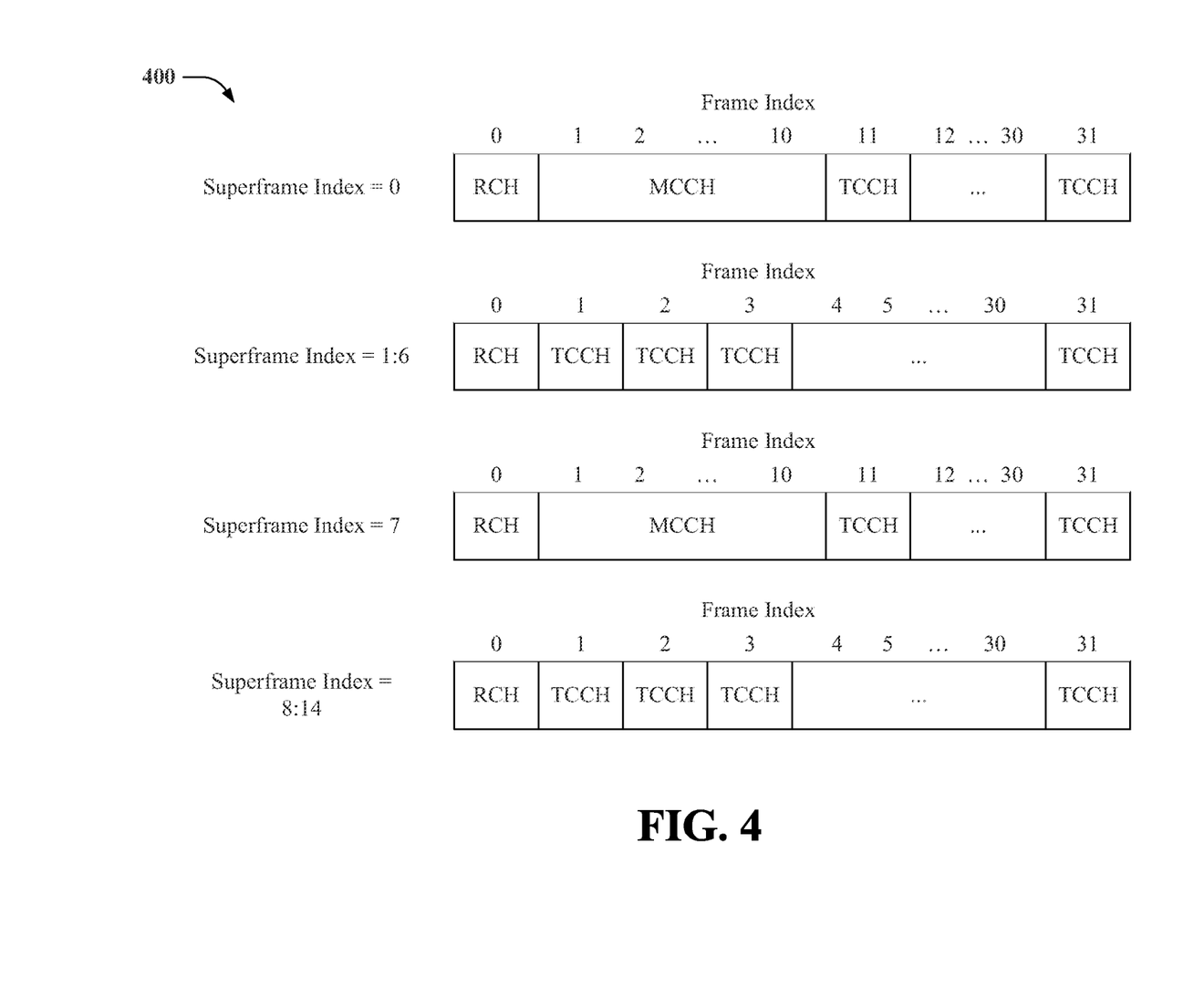
FIG. 4 is a diagram illustrating the channels in each frame of superframes in one grandframe.

FIG. 4 is a diagram 400 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
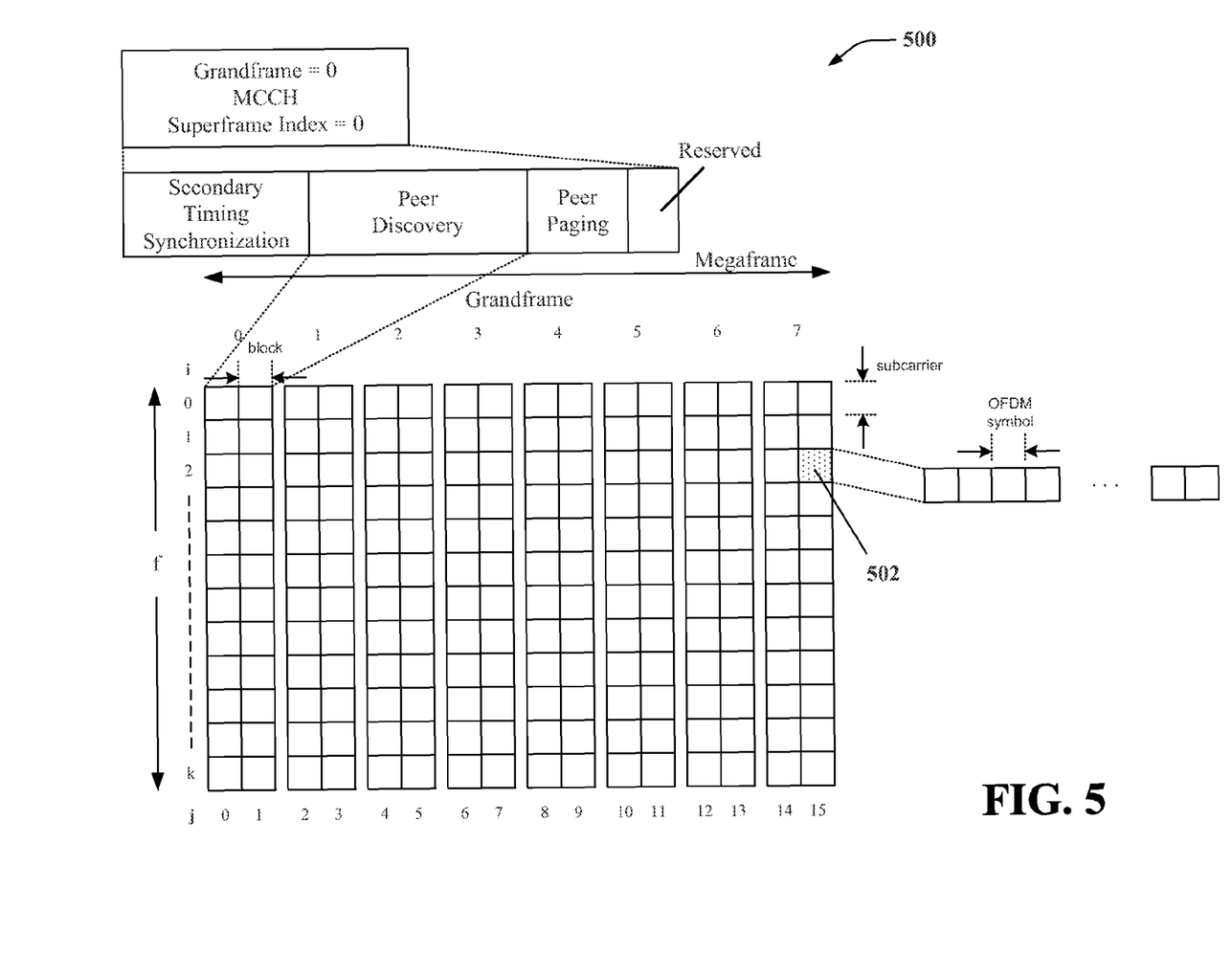
FIG. 5 is a diagram illustrating an operation timeline of a miscellaneous channel and an exemplary structure of a peer discovery channel.

FIG. 5 is a diagram 500 illustrating an operation timeline of the MCCH and an exemplary structure of a peer discovery channel. As discussed in relation to FIG. 4, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency divisional multiplexing (OFDM) symbols at the same subcarrier. FIG. 5 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 502 (i=2 and j=15) in a first megaframe of an ultraframe. The particular PDRID may map to other blocks in other megaframes of the ultraframe due to hopping. The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID if the determined energy on the peer discovery resource corresponding its PDRID is sufficiently higher than the detected energies on the other peer discovery resources corresponding to other PDRIDs.

Figure 6A:
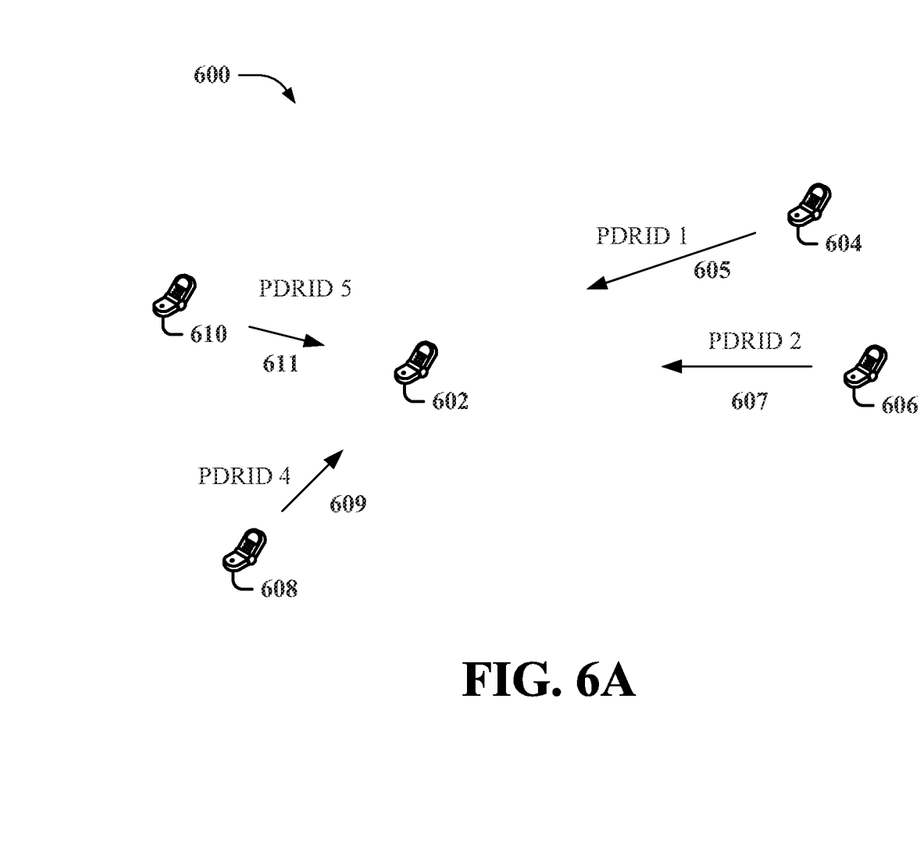
FIG. 6A is a diagram illustrating an exemplary method of selecting and reselecting peer discovery resource identifiers.
Figure 6B:
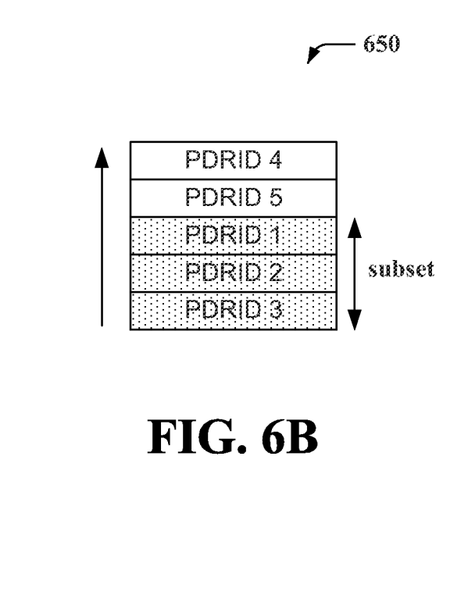
FIG. 6B is another diagram illustrating the exemplary method of selecting and reselecting peer discovery resource identifiers.

FIG. 6A is a diagram 600 illustrating an exemplary method of selecting and reselecting PDRIDs. FIG. 6B is a diagram 650 illustrating the exemplary method of selecting and reselecting PDRIDs. As shown in FIG. 6A and FIG. 6B, assume there are five PDRIDs and a wireless device 602 receives peer discovery signals 605 broadcasted from a wireless device 604 on resources corresponding to PDRID 1, peer discovery signals 607 broadcasted from a wireless device 606 on resources corresponding to PDRID 2, peer discovery signals 609 broadcasted from a wireless device 608 on resources corresponding to a PDRID 4, and peer discovery signals 611 broadcasted from a wireless device 610 on resources corresponding to PDRID 5. No wireless devices are using peer discovery resources corresponding to PDRID 3. The wireless device 602 determines an energy of each of the peer discovery signals of a set of the resources. The set may include all of the resources or a partial set of the resources. For example, the wireless device 602 may receive peer discovery signals on resources in various subchannels of the peer discovery channel and may determine an energy on each of the peer discovery signals on resources in one subchannel of the various subchannels. For a particular resource, the energy may be determined of a subset of the resource or of the entire resource. For example, if a particular resource corresponds to one block (see FIG. 5), an energy may be determined for a subset of the OFDM symbols in the block. The subset may include some or all of the OFDM symbols in the block.

Assume the wireless device 602 determines an energy of each of the peer discovery signals on the resources corresponding to PDRIDs 1 through 5. As such, the set includes PDRIDs 1 through 5. The wireless device 602 may rank the resources based on the determined energies of the peer discovery signals. Assume, as shown in FIG. 6B, that based on the determined energies of the peer discovery signals, the wireless device 602 ranks the resources from a lower energy to a higher energy in the order of PDRID 3, PDRID 2, PDRID 1, PDRID 5, and PDRID 4. After ranking the resources, the wireless device 602 may determine a subset of the resources with energies in a lowest percentage of the energies (e.g., 5%, 10%, or 20%) and/or that are sufficiently low for utilization. As shown in FIG. 6B, the wireless device 602 determines the subset of resources to include the resources corresponding to PDRID 3, PDRID 2, and PDRID 1, as these resources are in a subset of resources with the lowest energy and/or have an energy low enough to be utilized without causing too much interference to wireless devices utilizing the same resources. The remaining subset of resources includes the resources corresponding to PDRID 5 and PDRID 4.

After determining the subset of resources from which to select a resource, the wireless device 602 selects a resource based on a probability for each of the resources in the subset. The probability for selecting a resource with a lower determined energy is less than one and greater than the probability for selecting a resource with a higher determined energy. For example, the probability that the wireless device 602 selects the resource corresponding to PDRID 1 may be ⅓ while the probability that the wireless device 602 selects the resource corresponding to PDRID 5 may be zero. In another example, the probability that the wireless device 602 selects the resource corresponding to PDRID 3 may be higher than the probability that the wireless device 602 selects the resource corresponding to the PDRID 2 and the resource corresponding to PDRID 1. After selecting the resource, the wireless device 602 transmits a signal on the selected resource.

As described supra, each of the resources for communicating a peer discovery signal may comprise a set of frequencies and time periods. In addition, each resource in the remaining subset of resources may have a probability of being selected equal to zero. For example, the probability of selecting resources corresponding to PDRID 4 and PDRID 5 may be equal to zero. The wireless device 602 may combine some or all of the determined energies for the same resources over multiple timeslots before selecting a resource based on the determined energies. For example, the wireless device 602 may determine and combine energies for some or all of the peer discovery resources in two or more megaframes. The wireless device 602 may select a resource based on an average energy, a maximum energy, a minimum energy, or a time weighted energy of the peer discovery signals. When time weighted, the wireless device 602 may weight determined energies higher for resources in more recent megaframes.

Upon selecting and utilizing a particular PDRID, the wireless device 602 may reselect the PDRID when an energy on its peer discovery resources are sufficiently higher than an energy on other peer discovery resources. The wireless device 602 may listen rather than transmit on its selected peer discovery resource. By listening on the selected resource, the wireless device 602 may receive at least one signal on the selected resource if another wireless device is utilizing the same PDRID. The wireless device 602 may then determine a resource energy on the resource, compare the resource energy with an energy for each resource in a subset of resources with an energy sufficiently low to be utilized for peer discovery, and reselect a resource based on the comparison. For example, assume that the wireless device 602 is utilizing PDRID 5. The wireless device 602 may listen on the resource corresponding to PDRID 5 and determine an energy on the resource. The wireless device 602 may compare the resource energy with energies for resources in the subset of resources corresponding to PDRIDs 1, 2, and 3.

The wireless device 602 may reselect to a resource corresponding to one of the PDRIDs 1, 2, or 3 based on the comparison. The wireless device 602 may reselect to a resource corresponding to one of the PDRIDs 1, 2, or 3 when a difference and or ratio between the energy on the resource for PDRID 5 and the resource for PDRID 1 (i.e., a resource with a highest energy in the subset including PDRID 1, PDRID 2, and PDRID 3) is greater than a threshold. The wireless device 602 may reselect the resource corresponding to one of the PDRIDs 1, 2, or 3 randomly (i.e., with equal probability) or based on the PDRID ranking. When the difference or ratio between the selected resource and the resource with a highest energy in the subset is greater than the threshold, the wireless device 602 may always reselect a resource from the subset or may reselect based on a probability. The probability may be based on the difference or ratio. For example, assume the difference d between the energy for the resource for PDRID 5 and PDRID 1 is greater than a threshold T (i.e., d>T). The wireless device 602 may reselect to one of the resources for PDRID 1, 2, or 3 based on a probability P and the probability P may be based on the size of the difference d between the energies for the resources for PDRIDs 5 and 1, with a higher probability with a greater difference d.

Alternatively or in addition to being based on the difference d and/or ratio between energies, the probability P may be based on a number of times the resource has been reselected within a time period. That is, the probability P may be lower than otherwise when the peer discovery resources have been reselected many times within a short time period. The threshold T may also be based on a number of times the resource has been reselected within a time period, with a higher threshold T when the peer discovery resources have been reselected many times within a short time period. Lowering the probability P or increasing the threshold T will decrease the likelihood of reselection. The wireless device 602 may also increase or decrease a number of resources in the subset based on a number of times the resource has been reselected within a time period. That is, when the wireless device 602 reselects a PDRID many times within a short time period, the wireless device 602 may tighten its constraints on reselecting a PDRID by decreasing the number of resources in the subset and therefore reselect a PDRID from a smaller set of resources with a lower average energy. On the other hand, when reselection does not occur as frequently, the wireless device 602 may loosen its constraints on reselecting a PDRID by increasing the number of resources in the subset.

Figure 7:
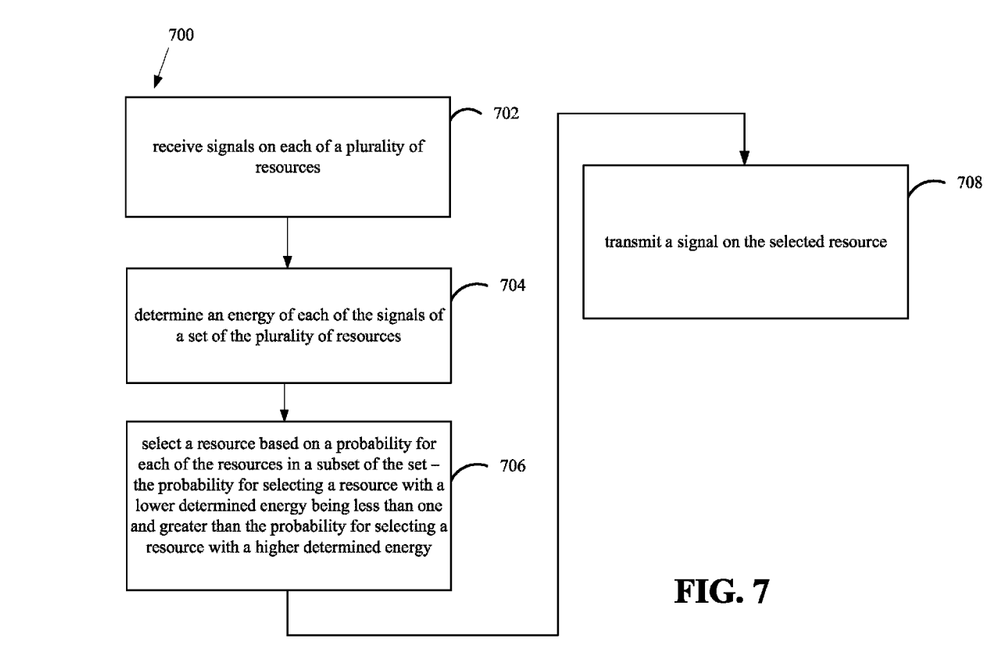
FIG. 7 is a flow chart of an exemplary method of a wireless device.

FIG. 7 is a flow chart 700 of an exemplary method of a wireless device, such as apparatus 100. As shown in FIG. 7, the wireless device receives signals on each of a plurality of resources (702), determines an energy of each of the signals of a set of the plurality of resources (704), and selects a resource based on a probability for each of the resources in a subset of the set (706). The probability for selecting a resource with a lower determined energy is less than one and greater than the probability for selecting a resource with a higher determined energy. In addition, the wireless device transmits a signal on the selected resource (708). In one configuration, each of the resources includes a set of frequencies and time periods for communicating a peer discovery signal. In one configuration, the wireless device ranks the resources in the set based on the determined energies of the signals, and determines the subset of the resources to include resources with lower energies than a remaining subset of resources. Each resource in the remaining subset of resources may have a probability of being selected equal to zero.

Figure 8:
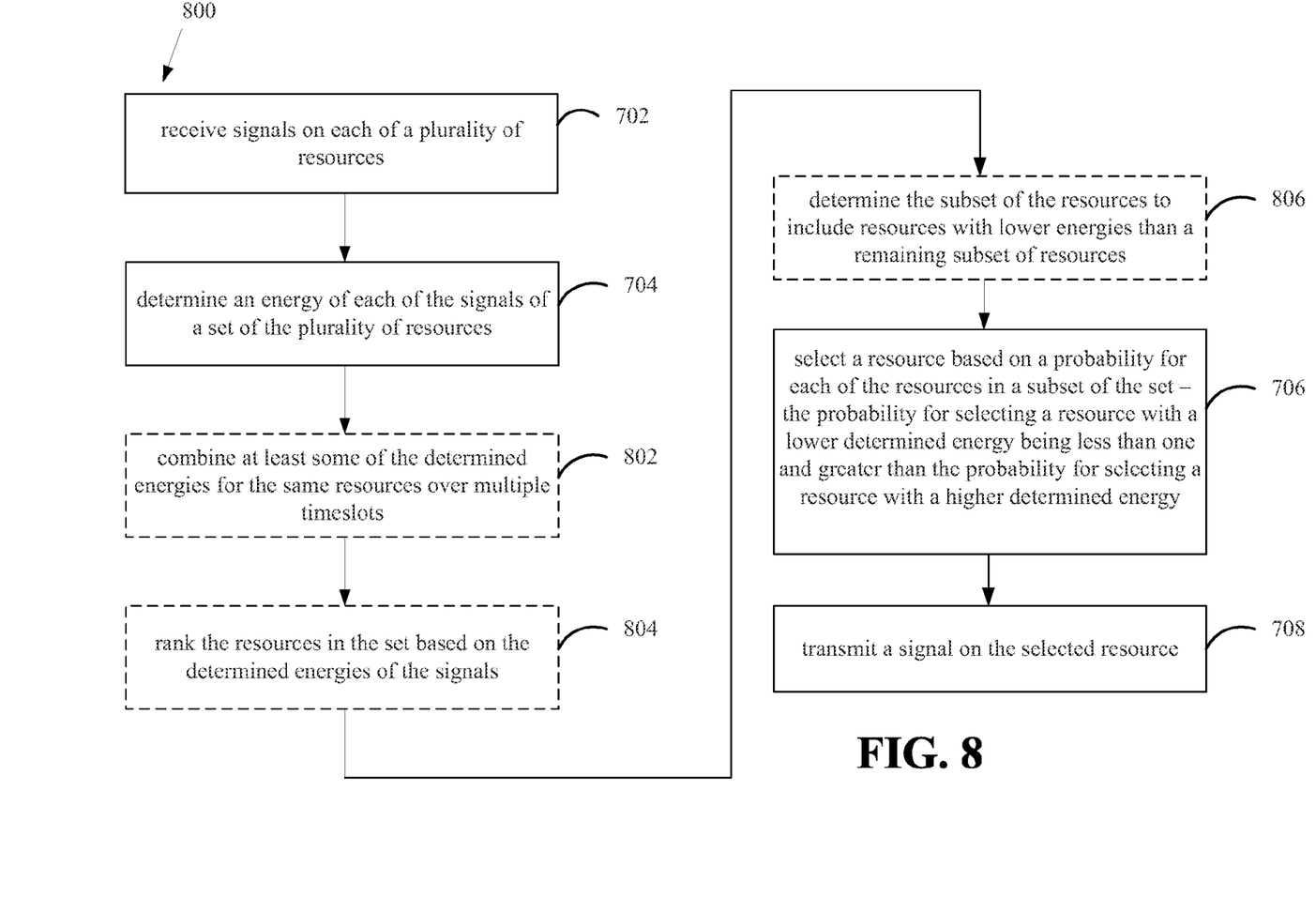
FIG. 8 is another flow chart of an exemplary method of a wireless device.

FIG. 8 is a flow chart 800 of another exemplary method. As shown in FIG. 8, after the wireless device determines an energy of each of the signals of a set of the plurality of resources (704), the wireless device may combine at least some of the determined energies for the same resources over multiple timeslots (802). In addition, the wireless device may rank the resources in the set based on the combined determined energies of the signals (804) and may determine the subset of the resources to include resources with lower combined energies than a remaining subset of resources (806). In one configuration, to combine the determined energies, the wireless device averages the determined energies for the same resources over the multiple timeslots. In one configuration, to combine the determined energies, the wireless device uses a maximum determined energy for the same resources over the multiple timeslots as the determined energy. In one configuration, to combine the determined energies, the wireless device uses a minimum determined energy for the same resources over the multiple timeslots as the determined energy. In one configuration, to combine the determined energies, the wireless device time weights the determined energies for the same resources over the multiple timeslots.

Figure 9:
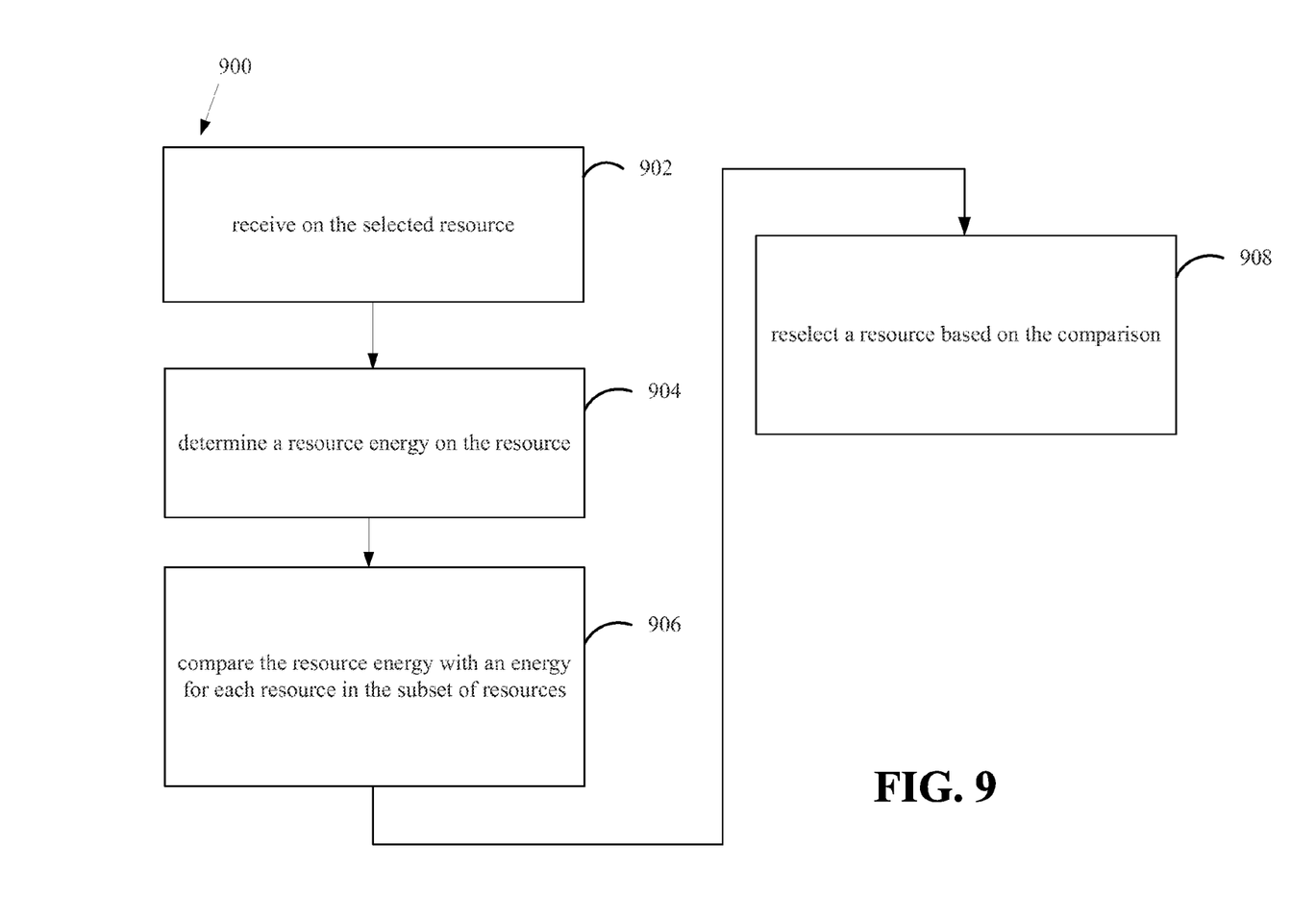
FIG. 9 is yet another flow chart of an exemplary method of a wireless device.

FIG. 9 is a flow chart 900 of another exemplary method. As shown in FIG. 9, the wireless device may receive on the selected resource (902), determine a resource energy on the resource (904), compare the resource energy with an energy for each resource in the subset of resources (906), and reselect a resource based on the comparison (908). As described supra, the wireless device may also combine the resource energies for some or all of the peer discovery resources and perform the reselection based on the combined and uncombined resource energies. That is, for some or all of the peer discovery resources, the wireless device may combine the resource energies for the same resources over multiple timeslots and perform the comparison and reselection based on the combined resource energies. The wireless device may reselect a resource based on an average energy, a maximum energy, a minimum energy, or a time weighted energy of the peer discovery signals. When time weighted, the wireless device may weight determined energies higher for resources in more recent megaframes.

To reselect the resource, the wireless device may reselect to a resource in the subset based on a probability when a difference between the resource energy and a second resource energy derived from at least one resource energy in the subset is greater than a first threshold and/or a ratio between the resource energy and the second resource energy is greater than a second threshold. The second resource energy may be a highest energy of a resource in the subset. The reselecting may be random in the subset. The probability may be equal to one. The probability may be based on said difference and/or said ratio. The probability may be based on a number of times the resource has been reselected within a time period. The first threshold and/or the second threshold may be based on a number of times the resource has been reselected within a time period. The wireless device may increase or decrease a number of resources in the subset based on a number of times the resource has been reselected within a time period.

Figure 10:
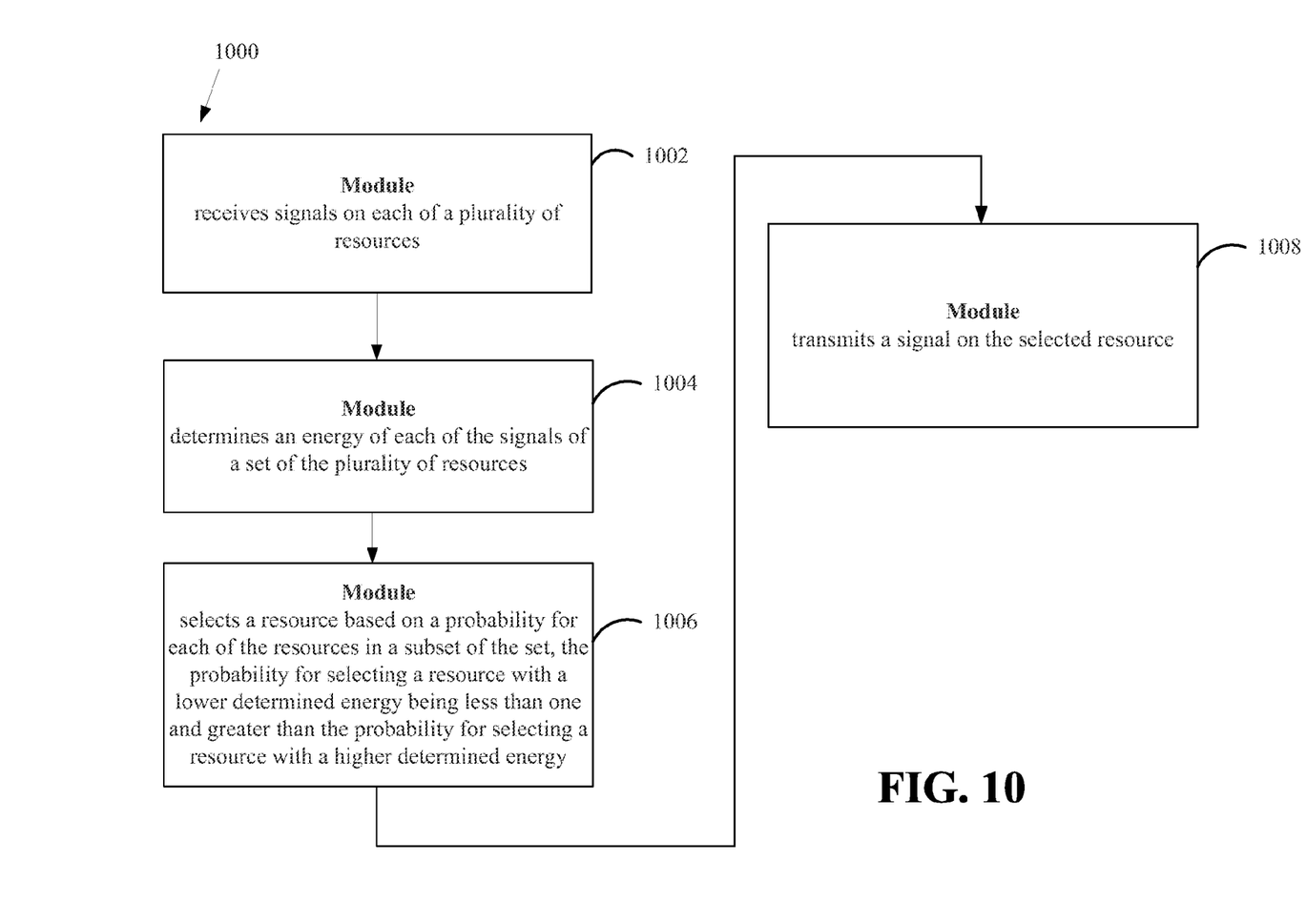
FIG. 10 is a conceptual block diagram illustrating the functionality of an exemplary apparatus.

FIG. 10 is a conceptual block diagram 1000 illustrating the functionality of an exemplary apparatus 100. The apparatus 100 includes a module 1002 that receives signals on each of a plurality of resources, a module 1004 that determines an energy of each of the signals of a set of the plurality of resources, and a module 1006 that selects a resource based on a probability for each of the resources in a subset of the set. The probability for selecting a resource with a lower determined energy is less than one and greater than the probability for selecting a resource with a higher determined energy. In addition, the apparatus 100 includes a module 1008 that transmits a signal on the selected resource.

Referring to FIG. 1, in one configuration, the apparatus 100 for wireless communication includes means for receiving signals on each of a plurality of resources, means for determining an energy of each of the signals of a set of the plurality of resources, and means for selecting a resource based on a probability for each of the resources in a subset of the set. The probability for selecting a resource with a lower determined energy is less than one and greater than the probability for selecting a resource with a higher determined energy. In addition, the apparatus 100 includes means for transmitting a signal on the selected resource. In one configuration, the apparatus 100 further includes means for ranking the resources in the set based on the determined energies of the signals and means for determining the subset of the resources to include resources with lower energies than a remaining subset of resources. In one configuration, the apparatus 100 further includes means for combining the determined energies for the same resources over multiple timeslots. In one configuration, the apparatus 100 further includes means for receiving at least one signal on the selected resource, means for determining a resource energy of the at least one signal, means for comparing the resource energy with an energy for each resource in the subset of resources, and means for reselecting a resource based on the comparison. In one configuration, the apparatus 100 further includes means for increasing or decreasing a number of resources in the subset based on a number of times the resource has been reselected within a time period. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a wireless device, comprising:
receiving signals on each of a plurality of resources;
determining an energy of each of the signals of a set of the plurality of resources;
ranking the resources in the set based at least in part on the determined energies of the signals;
determining a subset of the ranked set of resources, the subset comprising resources with lower energies than a remaining subset of resources in the ranked set;
selecting a resource based on a probability for each of the resources in the subset of the ranked set, the probability for selecting a resource with a lower determined energy being less than one and greater than the probability for selecting a resource with a higher determined energy, wherein the probability is additionally based on a number of times the resource has been reselected within a time period; and
transmitting a signal on the selected resource.

2. The method of claim 1, wherein each of the resources comprises a set of frequencies and time periods for communicating a peer discovery signal.

3. The method of claim 1, wherein each resource in the remaining subset of resources has a probability of being selected equal to zero.

4. The method of claim 1, further comprising combining at least some of the determined energies for the same resources over multiple timeslots.

5. The method of claim 4, wherein the combining comprises averaging the determined energies for the same resources over the multiple timeslots.

6. The method of claim 4, wherein the combining comprises using a maximum determined energy for the same resources over the multiple timeslots as the determined energy.

7. The method of claim 4, wherein the combining comprises using a minimum determined energy for the same resources over the multiple timeslots as the determined energy.

8. The method of claim 4, wherein the combining comprises time weighting the determined energies for the same resources over the multiple timeslots.

9. The method of claim 1, further comprising:
receiving on the selected resource;
determining a resource energy on the selected resource;
comparing the resource energy with an energy for each resource in the subset of resources; and
reselecting a resource based on the comparison.

10. The method of claim 9, further comprising combining at least some of the determined energies for the same resources over multiple timeslots, wherein the comparing is based on the combined energies.

11. The method of claim 10, wherein the combining comprises one of averaging the determined energies for the same resources over the multiple timeslots, using a maximum determined energy for the same resources over the multiple timeslots as the determined energy, using a minimum determined energy for the same resources over the multiple timeslots as the determined energy, or time weighting the determined energies for the same resources over the multiple timeslots.

12. The method of claim 9, wherein the reselecting the resource comprises reselecting to a resource in the subset based on a probability when at least one of a difference between the resource energy and second resource energy derived from at least one resource energy in the subset is greater than a first threshold or a ratio between the resource energy and the second resource energy is greater than a second threshold.

13. The method of claim 12, wherein the second resource energy is a highest energy of a resource in the subset.

14. The method of claim 12, wherein the reselecting is random in the subset.

15. The method of claim 12, wherein the probability is equal to one.

16. The method of claim 12, wherein the probability is based on at least one of said difference or said ratio.

17. The method of claim 12, wherein at least one of said first threshold or said second threshold is based on a number of times the resource has been reselected within a time period.

18. The method of claim 12, further comprising increasing or decreasing a number of resources in the subset based on a number of times the resource has been reselected within a time period.

19. An apparatus for wireless communication, comprising:
means for receiving signals on each of a plurality of resources;
means for determining an energy of each of the signals of a set of the plurality of resources;
means for ranking the resources in the set based at least in part on the determined energies of the signals;
means for determining a subset of the ranked set of resources, the subset comprising resources with lower energies than a remaining subset of resources in the ranked set;
means for selecting a resource based on a probability for each of the resources in the subset of the ranked set, the probability for selecting a resource with a lower determined energy being less than one and greater than the probability for selecting a resource with a higher determined energy, wherein the probability is additionally based on a number of times the resource has been reselected within a time period; and
means for transmitting a signal on the selected resource.

20. The apparatus of claim 19, wherein each of the resources comprises a set of frequencies and time periods for communicating a peer discovery signal.

21. The apparatus of claim 19, wherein each resource in the remaining subset of resources has a probability of being selected equal to zero.

22. The apparatus of claim 19, further comprising means for combining at least some of the determined energies for the same resources over multiple timeslots.

23. The apparatus of claim 22, wherein the means for combining averages the determined energies for the same resources over the multiple timeslots.

24. The apparatus of claim 22, wherein the means for combining uses a maximum determined energy for the same resources over the multiple timeslots as the determined energy.

25. The apparatus of claim 22, wherein the means for combining uses a minimum determined energy for the same resources over the multiple timeslots as the determined energy.

26. The apparatus of claim 22, wherein the means for combining time weights the determined energies for the same resources over the multiple timeslots.

27. The apparatus of claim 19, further comprising:
means for receiving on the selected resource;
means for determining a resource energy on the selected resource;
means for comparing the resource energy with an energy for each resource in the subset of resources; and
means for reselecting a resource based on the comparison.

28. The apparatus of claim 27, further comprising means for combining at least some of the determined energies for the same resources over multiple timeslots, wherein the means for comparing compares based on the combined energies.

29. The apparatus of claim 28, wherein the means for combining averages the determined energies for the same resources over the multiple timeslots, uses a maximum determined energy for the same resources over the multiple timeslots as the determined energy, uses a minimum determined energy for the same resources over the multiple timeslots as the determined energy, or time weights the determined energies for the same resources over the multiple timeslots.

30. The apparatus of claim 27, wherein the means for reselecting the resource reselects to a resource in the subset based on a probability when at least one of a difference between the resource energy and second resource energy derived from at least one resource energy in the subset is greater than a first threshold or a ratio between the resource energy and the second resource energy is greater than a second threshold.

31. The apparatus of claim 30, wherein the second resource energy is a highest energy of a resource in the subset.

32. The apparatus of claim 30, wherein the means for reselecting reselects randomly in the subset.

33. The apparatus of claim 30, wherein the probability is equal to one.

34. The apparatus of claim 30, wherein the probability is based on at least one of said difference or said ratio.

35. The apparatus of claim 30, wherein at least one of said first threshold or said second threshold is based on a number of times the resource has been reselected within a time period.

36. The apparatus of claim 30, further comprising means for increasing or decreasing a number of resources in the subset based on a number of times the resource has been reselected within a time period.

37. A computer program product in a wireless device, comprising:
a non-transitory computer-readable storage medium comprising code for:
receiving signals on each of a plurality of resources;
determining an energy of each of the signals of a set of the plurality of resources;
ranking the resources in the set based at least in part on the determined energies of the signals;
determining a subset of the ranked set of resources, the subset comprising resources with lower energies than a remaining subset of resources in the ranked set;
selecting a resource based on a probability for each of the resources in the subset of the ranked set, the probability for selecting a resource with a lower determined energy being less than one and greater than the probability for selecting a resource with a higher determined energy, wherein the probability is additionally based on a number of times the resource has been reselected within a time period; and
transmitting a signal on the selected resource.

38. The computer program product of claim 37, wherein the non-transitory computer-readable storage medium further comprises code for:
receiving on the selected resource;
determining a resource energy on the selected resource;
comparing the resource energy with an energy for each resource in the subset of resources; and
reselecting a resource based on the comparison.

* * * * *